(12) United States Patent
Shirsat

(10) Patent No.: US 12,648,564 B2
(45) Date of Patent: Jun. 9, 2026

(54) INSECTICIDAL COMPOSITIONS RESISTANT TO ACTIVE INGREDIENT DEGRADATION AND PROCESS FOR PREPARATION THEREOF

(71) Applicant: UPL LTD, Haldia (IN)

(72) Inventor: Rajan Ramakant Shirsat, Mumbai (IN)

(73) Assignee: UPL LTD, Haldia (IN)

( * ) Notice: Subject to any disclaimer, the term of this patent is extended or adjusted under 35 U.S.C. 154(b) by 951 days.

(21) Appl. No.: 17/426,309

(22) PCT Filed: Feb. 5, 2020

(86) PCT No.: PCT/IB2020/050911
§ 371 (c)(1),
(2) Date: Jul. 28, 2021

(87) PCT Pub. No.: WO2020/161634
PCT Pub. Date: Aug. 13, 2020

(65) Prior Publication Data
US 2022/0104498 A1      Apr. 7, 2022

(30) Foreign Application Priority Data
Feb. 7, 2019      (IN) .............................. 201931004935

(51) Int. Cl.
| | |
|---|---|
| *A01N 57/28* | (2006.01) |
| *A01N 25/02* | (2006.01) |
| *A01N 25/22* | (2006.01) |
| *A01P 7/04* | (2006.01) |

(52) U.S. Cl.
CPC ............. *A01N 57/28* (2013.01); *A01N 25/02* (2013.01); *A01N 25/22* (2013.01); *A01P 7/04* (2021.08)

(58) Field of Classification Search
CPC ........ A01N 57/28; A01N 25/02; A01N 25/22; A01P 7/04
See application file for complete search history.

(56) References Cited

U.S. PATENT DOCUMENTS

| | | | |
|---|---|---|---|
| 5,298,501 A | | 3/1994 | Cummings |
| 5,464,623 A | | 11/1995 | Chen et al. |
| 2006/0293287 A1* | 12/2006 | Jadhav ................... | A01N 51/00 514/114 |
| 2012/0135962 A1* | 5/2012 | Johannessen .......... | A01N 57/16 514/81 |

FOREIGN PATENT DOCUMENTS

| | | | |
|---|---|---|---|
| CN | 103621569 A | | 3/2014 |
| CN | 104045474 A | | 9/2014 |
| CN | 104663708 A | | 6/2015 |
| CN | 104909953 A | * | 9/2015 |
| CN | 105724440 A | | 7/2016 |

OTHER PUBLICATIONS

International Search Report and Written Opinion for International Application PCT/IB2020/050911; International Filing Date: Feb. 5, 2020; Date of Mailing: Mar. 25, 2020; 9 pages.

* cited by examiner

*Primary Examiner* — Kamal A Saeed
*Assistant Examiner* — Quincy Mckoy
(74) *Attorney, Agent, or Firm* — CANTOR COLBURN LLP

(57) ABSTRACT

The present invention provides compositions comprising phosphoramidothioates that are resistant to degradation of active ingredient. The invention provides a process for preparing granular compositions comprising acephate that are resistant to degradation of active ingredient, wherein said process comprises use of a mixture of water and an electrolyte.

5 Claims, No Drawings

INSECTICIDAL COMPOSITIONS RESISTANT TO ACTIVE INGREDIENT DEGRADATION AND PROCESS FOR PREPARATION THEREOF

CROSS REFERENCE TO RELATED APPLICATIONS

This application is a National Stage application of PCT/IB2020/050911, filed Feb. 5, 2020, which claims the benefit of priority to Indian patent application Ser. No. 20/193, 1004935, filed Feb. 7, 2019, both of which are incorporated by reference in their entirety herein.

FIELD OF THE INVENTION

The present invention relates to insecticidal compositions resistant to active ingredient degradation. The present invention provides compositions comprising phosphoramidothioates that are resistant to degradation of active ingredient. The present invention further provides a process for preparing granular compositions comprising phosphoramidothioates that are resistant to degradation of active ingredient, wherein said process comprises use of water and an electrolyte.

BACKGROUND OF THE INVENTION

Phosphoramidothioates are known for their excellent insecticidal activity against a variety of insects in various environments. Acephate, a systemic insecticide, is one of widely used phosphoramidothioate that controls a wide range of chewing and sucking insects, e.g. aphids, thrips, lepidopterous larvae, sawflies, leaf miners, leafhoppers, cutworms, etc., in fruit (including citrus), vines, hops, olives, cotton, soya beans, peanuts, macadamia nuts, beet, brassicas, celery, beans, potatoes, rice, tobacco, ornamentals, forestry, and other crops.

Phosphoramidothioates are known to suffer from stability issues due to their hydrolytic sensitivity. Attempts have been made in the art for solving the degradative issue of acephate and to prepare stable insecticidal product. Some of the methods include use of solvent as an extrusion aid, keeping specific temperature conditions while extruding, specific equipment such as compaction and other stabilizers and adopting special procedures.

U.S. Pat. No. 5,298,501 discloses chemically stable insecticidal compositions of phosphoramidothioates. The compositions comprise at least 83% of ammonium sulfate effective for granulating the insecticidal components in the absence of which the composition suffer from chemical stability problems due to hydrolytic and catalytic driven degradation of phosphoramidothioates which in turn shortens the shelf life of the product.

U.S. Pat. No. 5,464,623 discloses preparation method for stable insecticidal compositions comprising acephate. The method involves the mixing of dry insecticidal composition with from 3-25% of a solvent to form a consistency of damp sandy loam and then extruded. A preferable solvent should have a high volatility so that the pellets may be dried. The method further uses a dehydrating agent to absorb trace amount of water present in the pellets to prevent hydrolysis of the insecticide. The method is highly unsafe for the environment.

What is needed for some time has been a granulation technique which utilizes commonly operated granulating equipment, avoiding the use of environmentally unsafe solvents, special techniques or equipment.

Inventors of the present invention established a safe and environmentally friendly method of formulation using water as a medium resulting in a stable insecticidal composition comprising acephate.

OBJECTS OF THE INVENTION

It is an object of the present invention to provide environmentally safe granulating process for compositions comprising phosphoramidothioates.

It is another object of the present invention to provide a composition comprising phosphoramidothioates that is resistant to active ingredient degradation.

SUMMARY OF THE INVENTION

In an aspect the present invention provides a composition comprising:
  a) a phosphoramidothioate; and
  b) an electrolyte;
    wherein said composition is formulated using a mixture of water and said electrolyte.

In another aspect the present invention provides a stable composition resistant to active ingredient degradation comprising:
  c) a phosphoramidothioate as an active ingredient; and
  d) an electrolyte;
    wherein said composition is formulated using a mixture of water and said electrolyte.

In another aspect the present invention provides a composition resistant to active ingredient degradation comprising:
  a) acephate; and
  b) an electrolyte;
    wherein said composition is formulated using a mixture of water and said electrolyte.

In another aspect the present invention provides a composition resistant to active ingredient degradation comprising:
  a) a phosphoramidothioate as an active ingredient;
  b) an electrolyte; and
  c) one or more active ingredients;
    wherein said composition is formulated using a mixture of water and said electrolyte.

In another aspect the present invention provides a process for preparing composition of phosphoramidothioate resistant to active ingredient degradation, said process comprising:
  Step 1: preparing a mixture of water and an electrolyte;
  Step 2: preparing a blend of phosphoramidothioate, remaining electrolyte if any, and other excipients;
  Step 3: preparing an admixture of step 2 blend with said mixture of step 1; and
  Step 4: formulating to a suitable form using a suitable equipment.

In another aspect the present invention provides a process for preparing composition of phosphoramidothioate resistant to active ingredient degradation, said process comprising:
  Step 1: preparing a mixture of water and an electrolyte;
  Step 2: preparing a blend of phosphoramidothioate, remaining electrolyte if any, one or more other active ingredients and other excipients;
  Step 3: preparing an admixture of step 2 blend with said mixture of step 1; and
  Step 4: formulating to a suitable form using a suitable equipment.

In another aspect the present invention provides a process for preparing composition of acephate resistant to active ingredient degradation, said process comprising:

Step 1: preparing a mixture of water and an electrolyte;

Step 2: preparing a blend of acephate, remaining electrolyte if any, and other excipients;

Step 3: preparing an admixture of step 2 blend with mixture of step 1; and

Step 4: formulating to a suitable form using a suitable equipment.

In another aspect the present invention provides a method for controlling insects, comprising applying to an area to be treated, an effective amount of a composition according to the present invention.

Additional features and advantages of the proposed invention will be apparent from the detailed description that follows, which illustrates by way of example, the most preferred features of the proposed invention which are not to be construed as limiting the scope of the invention described herein.

DETAILED DESCRIPTION OF INVENTION

Unless defined otherwise, all technical and scientific terms used herein have the same meaning as commonly understood by one of ordinary skill in the art to which this invention belongs. It must be noted that, as used in this specification, the singular forms "a," "an" and "the" include plural referents unless the content clearly dictates otherwise.

The term "about" used to qualify the amounts of mancozeb and carbendazim shall be interpreted to mean "approximately" or "reasonably close to" and any statistically insignificant variations therefrom.

As used herein, the terms "comprising" "including," "having," "containing," "involving," and the like are to be understood to be open-ended, i.e., to mean including but not limited to. The terms "preferred" and "preferably" refer to embodiments of the invention that may afford certain benefits, under certain circumstances.

In an embodiment, the aspects and embodiments described herein shall also be interpreted to replace the clause "comprising" with either "consisting of" or with "consisting essentially of" or with "consisting substantially of".

The present invention provides a composition resistant to active ingredient degradation. It has been observed that moisture sensitive active ingredients require specific equipment and conditions for preparing stable commercial products. Inventors of the present invention surprisingly found out that stable compositions can be prepared by a suitable process comprising the use of water and an electrolyte when a moisture sensitive active ingredient is used. The method can further be used, when combination products are prepared with a moisture sensitive active ingredient.

Thus, present invention provides a composition that is resistant to active ingredient degradation.

The present invention provides a composition comprising:

a) a phosphoramidothioate as an active ingredient; and b) an electrolyte;

wherein said composition is formulated using a mixture of water and said electrolyte.

In an embodiment the phosphoramidothioate active ingredient is selected from acephate, chloramine phosphorus, isocarbophos, isofenphos, isofenphos-methyl methamidophos, phosglycin, or propetamphos.

In a preferred embodiment the phosphoramidothioate active ingredient is acephate.

The present invention provides a composition resistant to active ingredient degradation comprising:

a) acephate; and b) an electrolyte;

wherein said composition is formulated using a mixture of water and said electrolyte.

The term degradation refers to chemical degradation. Chemical degradation includes hydrolytic, photolytic and catalytic degradation.

In an embodiment, according to the present invention, degradation of active ingredient is controlled.

In another embodiment, according to the present invention, degradation of acephate is controlled.

In another embodiment, according to the present invention, degradation of acephate is controlled to <5% by weight of acephate in the composition.

In an embodiment, in the compositions according to the present invention, degradation of acephate is controlled even after using water as the medium for formulating.

In another embodiment, in the compositions according to the present invention, degradation of acephate is controlled to less than 5% even after using water as the medium for formulating.

In another embodiment, in the compositions according to the present invention, degradation of acephate is controlled to <3% even after using water as the medium for formulating.

In an embodiment, the composition comprises acephate in an amount from about 0.1% to about 99% by weight of the composition.

In another embodiment, the composition comprises acephate in an amount from about 1% to about 97% by weight of the composition.

In an embodiment, water is used as medium for formulating the compositions according to the present invention.

In an embodiment, the composition comprises an electrolyte.

In an embodiment, the composition comprises an electrolyte in an amount from about 1% to about 97% by weight of the composition.

In another embodiment, the composition comprises an electrolyte in an amount from about 1% to about 50% by weight of the composition.

In an embodiment, the electrolyte is selected from an inorganic or organic salt.

In an embodiment the inorganic salt is selected from the group comprising salts of strong acids with strong bases, strong acids with weak base, weak acid with strong base and weak acid with weak base.

In a preferred embodiment the inorganic salt is salt of a strong acid with a weak base.

In an embodiment, the inorganic salt is selected from ammonium salts, alkali and alkaline earth metal slats etc.

In another embodiment, the inorganic salt is selected from phosphates, carbonates, sulfates, chlorides, nitrates, oxides and hydroxides etc.

In another embodiment, the organic salt is selected from alkali or alkaline earth metal salt of an organic acid.

In yet another embodiment, the organic salt is selected from alkali metal salt of a weak organic acid.

In another embodiment, the weak organic acid includes acetic acid, oxalic acid, citric acid, tartaric acid, propionic acid and the like.

In an embodiment the electrolyte is selected from the group comprising sodium chloride, calcium chloride, potassium chloride, magnesium chloride, sodium acetate, calcium acetate, magnesium carbonate, sodium carbonate, calcium carbonate, potassium carbonate, calcium phosphate, sodium phosphate, ammonium phosphate, diammonium phosphate dihydrate, magnesium phosphate, ammonium sulfate, ammonium chloride, ammonium acetate, magnesium sulfate, sodium sulfate, calcium sulfate, zinc sulfate, sodium acetate, calcium oxalate, calcium acetate, trisodium citrate and the like.

In an embodiment, present invention provides a composition that is resistant to active ingredient degradation comprising:

a) a phosphoramidothioate as an active ingredient;

b) an electrolyte; and c) one or more active ingredients;

wherein said composition is formulated using a mixture of water and said electrolyte.

In an embodiment the compositions according to the present invention comprises one or more another active ingredient.

In an embodiment another active ingredient that can be present in compositions according to the present invention is selected from insecticides, attractants, bactericides, acaricides, nematicides, fungicides, herbicides and growth regulators.

In another embodiment, the active ingredient that can be present in compositions according to the present invention is selected from an organophosphorus compound, a chloronicotinyl compound, a diamide insecticide, a benzoylphenylurea chitin synthesis inhibitor or a pyrethroid compound.

In yet another embodiment, the organophosphorus compound may be selected from but not limited to aspon, azinphos-methyl, carbofuran, carbophenothion, chlorfenvinphos, chlorpyrifos, coumaphos, crotoxyphos, crufomate, demeton, diazinon, dichlorvos, dicrotophos, dimethoate, dioxathion, disulfoton, EPN, ethion, ethoprop, famphur, fenamiphos, fenitrothion, fensulfothion, fenthion, fonofos, isofenfos, malathion, methamidophos, methidathion, methyl parathion, mevinphos, monocrotophos, metam sodium, naled, oxydemeton-methyl, parathion, phorate, phosalone, phosmet, phosphamidon, profenofos, temephos, TEPP, terbufos, tetrachlorvinphos, trichlorfon, cypermethrin, fenvalerate, permethrin, alpha-cypermethrin, beta-cypermethrin, zeta-cypermethrin, deltamethrin, cyfluthrin, bifenthrin, lambda-cyhalothrin, and/or bioresmethrin, afoxolaner broflanilide, chlorantraniliprole, cyantraniliprole, cyclaniliprole, cyhalodiamide, flubendiamide, fluralaner, lotilaner, tetrachlorantraniliprole tetraniliprole bistrifluron, chlorbenzuron, chlorfluazuron, dichlorbenzuron, diflubenzuron, flucycloxuron, flufenoxuron, hexaflumuron, lufenuron, novaluron noviflumuron, penfluron, teflubenzuron, triflumuron or mixtures thereof.

In another embodiment, the chloronicotinyl compound may be selected from but not limited to acetamiprid, imidacloprid, thiacloprid, thiamethoxam and combinations thereof.

In another embodiment, the pyrethroid may be selected from but not limited to cypermethrin, fenvalerate, permethrin, alpha-cypermethrin, beta-cypermethrin, zeta-cypermethrin, deltamethrin, cyfluthrin, bifenthrin, lambda-cyhalothrin, and/or bioresmethrin or mixtures thereof.

In another embodiment, the active ingredient that can be present in the compositions according to the present invention is selected from nitrothal-isopropyl, myclobutanil, piproctanyl bromide, jodfenphos, Imazalil, lambda-cyhalothrin, triflumizole, vamidothion, xylylcarb, tolclofosmethyl, prothoate, pyriproxyfen, propamocarb hydrochloride, tefluthrin, resmethrin, chlorpropham, cloethocarb, demeton-S, cyfluthrin, azinphos-ethyl, azinphos-methyl, benalaxyl, benazolin-ethyl, butocarboxim, benzoximate, bioresmethrin, bromopropylate, borax, biphenyl, fluoroglycofen-ethyl, fenbucarb, fenthiocarb, fensulfothion, fosmethilan, furalaxyl, dikegulac, trinexapac-ethyl, ethiofencarb, etridiazole, fenamiphos, fenazaquin, EPN, dodemorph, mecarphon, etaconazole, fluorbenside, furmecyclox, fenfluthrin, fluenetil, acequinocyl, schradan, transfluthrin, cyprodinil, phosfolan, crufomate, chlorphoxim, chloropropylate, di-allate, chlorofenprop, camphechlor, chlorbenside, chlordimeform, phosphonic acid, trifloxystrobin, picoxystrobin, gamma-cyhalothrin, codlemone, spinetoram, cyflumetofen.

The invention further provides a composition resistant to active ingredient degradation comprising:

a) Acephate as an active ingredient;

b) an electrolyte; and c) one or more another active ingredient;

wherein said composition is formulated using a mixture of water and said electrolyte.

In another embodiment, another active ingredient that can be present in compositions according to the present invention is selected from an organophosphorus compound, a chloronicotinyl compound or a pyrethroid compound.

In another embodiment, said active ingredient that can be present in compositions according to the present invention is selected from acetamiprid, imidacloprid, thiacloprid, thiamethoxam, cypermethrin, fenvalerate, permethrin, alpha-cypermethrin, beta-cypermethrin, zeta-cypermethrin, deltamethrin, cyfluthrin, bifenthrin, lambda-cyhalothrin, bioresmethrin or mixtures thereof.

In an embodiment, the electrolyte is selected from an inorganic or organic salt.

In a preferred embodiment the inorganic salt is salt of a strong acid with a weak base.

In an embodiment, the inorganic salt is selected from ammonium salts, alkali and alkaline earth metal slats etc.

In another embodiment, the inorganic salt is selected from phosphates, carbonates, sulfates, chlorides, oxides and hydroxides etc.

In another embodiment, the weak organic acid includes acetic acid, oxalic acid, citric acid, tartaric acid, propionic acid and the like.

In an embodiment the electrolyte is selected from the group comprising sodium chloride, calcium chloride, potassium chloride, magnesium chloride, sodium acetate, calcium acetate, magnesium carbonate, sodium carbonate, calcium carbonate, potassium carbonate, calcium phosphate, sodium phosphate, ammonium phosphate, diammonium phosphate dihydrate, magnesium phosphate, ammonium sulfate, ammonium chloride, ammonium acetate, magnesium sulfate, sodium sulfate, calcium sulfate, zinc sulfate, sodium acetate, calcium oxalate, calcium acetate, trisodium citrate and the like.

Thus, in an embodiment the invention provides a composition resistant to active ingredient degradation comprising:

a) Acephate;

b) an electrolyte; and c) one or more active ingredients selected from acetamiprid, imidacloprid, thiacloprid, thiamethoxam, cypermethrin, fenvalerate, permethrin, alpha-cypermethrin, beta-cypermethrin, zeta-cypermethrin, deltamethrin, cyfluthrin, bifenthrin, lambda-cyhalothrin, bioresmethrin or mixtures thereof;

wherein said composition is formulated using a mixture of water and said electrolyte.

In an embodiment the invention provides a composition resistant to active ingredient degradation comprising:

a) Acephate;

b) an electrolyte; and c) acetamiprid, wherein said composition is formulated using a mixture of water and said electrolyte.

In another embodiment the invention provides a composition resistant to active ingredient degradation comprising:

a) Acephate;

b) an electrolyte; and c) beta-cypermethrin, wherein said composition is formulated using a mixture of water and said electrolyte.

In another embodiment the invention provides a composition resistant to active ingredient degradation comprising:

a) Acephate;

b) an electrolyte; and c) bifenthrin, wherein said composition is formulated using a mixture of water and said electrolyte.

In yet another embodiment the invention provides a composition resistant to active ingredient degradation comprising:

a) Acephate;

b) an electrolyte; and c) imidacloprid, wherein said composition is formulated using a mixture of water and said electrolyte.

In an embodiment the present invention provides a process for preparing a composition resistant to active ingredient degradation said process comprising:

Step 1: preparing a mixture of water and electrolyte;

Step 2: preparing a blend of phosphoramidothioate, remaining electrolyte if any and other excipients as required;

Step 3: preparing an admixture of step 2 blend with said mixture of step 1; and

Step 4: formulating the mixture to a suitable form using a suitable equipment.

In another embodiment the present invention provides a process for preparing composition resistant to active ingredient degradation said process comprising:

Step 1: preparing a mixture of water and electrolyte in a required measure;

Step 2: preparing a blend of acephate, remaining electrolyte if any with other excipients as required;

Step 3: preparing an admixture of step 2 blend with mixture of step 1; and Step 4: formulating a mixture to a suitable form using a suitable equipment In an embodiment the composition further comprises on or more other active ingredients.

In another embodiment the present invention provides a process for preparing composition resistant to active ingredient degradation said process comprising:

Step 1: preparing a mixture of water and electrolyte in a required measure;

Step 2: preparing a blend of acephate, remaining electrolyte if any with one or more other active ingredients and other excipients and as required;

Step 3: preparing an admixture of step 2 blend with mixture of step 1; and

Step 4: formulating a mixture to a suitable form using a suitable equipment

In an embodiment, the process comprises the use of electrolyte.

In an embodiment, the electrolyte is selected from an inorganic or organic salt.

In an embodiment the inorganic salt is selected from the group comprising salts of strong acids with strong bases, strong acids with weak base, weak acid with strong base and weak acid with weak base.

In a preferred embodiment the inorganic salt is salt of a strong acid with a weak base.

In an embodiment, the inorganic salt is selected from ammonium salts, alkali and alkaline earth metal slats etc.

In another embodiment, the inorganic salt is selected from phosphates, carbonates, sulfates, chlorides, oxides and hydroxides etc.

In another embodiment, the organic salt is selected from alkali or alkaline earth metal salt of an organic acid.

In yet another embodiment, the organic salt is selected from alkali or alkaline earth metal salt of a weak organic acid.

In another embodiment, the weak organic acid includes acetic acid, oxalic acid, citric acid, tartaric acid, propionic acid and the like.

In an embodiment, the electrolyte is used as a mixture in water in the process of making the composition.

In another embodiment, the mixture of electrolyte and water includes solutions, suspensions and the like.

In an embodiment, water is used in an amount from about 1% to about 40% by weight of the composition suitable for process.

In another embodiment, water is used in an amount from about 1% to about 20% by weight of the composition suitable for process.

In another embodiment, water is used in an amount from about 1% to about 10% by weight of the composition suitable for process.

In another embodiment the amount of electrolyte required for making a mixture in water varies from about 1% to about 25% by weight of the composition.

In yet another embodiment, the amount of electrolyte required for making a mixture in water varies from about 1% to about 15% by weight of the composition.

In an embodiment, the suitable process for the composition requires water and electrolyte in a ratio from about 1:1 to about 1:20.

In another embodiment the suitable process for the composition requires water and electrolyte in a ratio from about 1:1 to about 1:10.

In an embodiment, in step 2, preparing a blend of acephate, electrolyte and other excipients optionally with other active ingredients is not particularly limiting.

In an embodiment, in step 3, preparing an admixture of step 2 product with a mixture of step 1 is not particularly limiting.

In an embodiment, in step 3, said admixture is prepared by spraying mixture of step 1 onto step 2 product.

In another embodiment, in step 3, said admixture is prepared by batch-wise addition of mixture of step 1 onto step 2 product.

In an embodiment, in step 4, the process of formulating is not particularly limiting.

In a preferred embodiment, in step 4, the composition is formulated as granules.

In an embodiment, step 4 of the process uses readily available commercial extruding equipment.

In an embodiment, in step 4 of the process, the moisture in the granules has been reduced significantly.

In an embodiment the present process provides granules with at least a partial or complete moisture barrier on the surface of the material to prevent it from degradation.

In an embodiment, the moisture barrier comprises an electrolyte.

In another embodiment, the term granules refer to solid pellets, granules, grains and the like.

Typically, the process for preparing composition resistant to active ingredient degradation comprises preparing a mixture of water and electrolyte (Part A); preparing a blend of phosphoramidothioate, remaining electrolyte (Part B) optionally with one or more other active ingredients and other excipients; preparing a blend by mixing a mixture of Part A and Part B; and formulating a mixture to a suitable form using a suitable equipment.

Preferably, the process is carried out at room temperature and the blend is extruded using a basket extruder to get granules. The granules are dried (until the moisture content is <1%) and then packed.

The formulation is prepared by wet granulation method known to a person skilled in the art.

The stable insecticidal compositions of the present invention may further comprise one or more dispersants, wetting agents, carriers, anticaking agents, pH-regulating agents, preservatives, biocides, antifoaming agents, colorants and other formulation aids.

The dispersants may be selected from ionic and nonionic dispersants such as salts of polystyrene sulphonic acids, salts of polyvinylsulphonic acids, salts of naphthalenesulphonic acid/formaldehyde condensates, salts of condensates of naphthalenesulphonic acid, phenolsulphonic acid and formaldehyde, and salts of lignosulphonic acid, polyethylene oxide/polypropylene oxide block copolymers, polyethylene glycol ethers of linear alcohols, reaction products of fatty acids with ethylene oxide and/or propylene oxide, furthermore polyvinyl alcohol, polyvinylpyrrolidone, copolymers of polyvinyl alcohol and polyvinylpyrrolidone and copolymers of (meth)acrylic acid and (meth)acrylic esters, furthermore alkyl ethoxylates and alkylarylethoxylates ethoxylated alkylarylphosphated and sulphated ester.

The wetting agents may be selected from salts of aliphatic monoesters of sulphuric acid including but not limited to sodium lauryl sulphate; sulfoakylamides and salts thereof including but not limited to N-methyl-N-oleoyltaurate Na salt; akylarylsulfonates including but not limited to akyl-benzenesulfonates; akylnaphthalenesulfonates and salts thereof and salts of ligninsulfonic acid.

Carriers may include clays, silicas, sulphates, chlorides, carbohydrates, alkylated celluloses etc.

In an embodiment, the present invention provides a method for controlling insects, comprising applying to an area to be treated, an effective amount of a composition according to the present invention.

In an embodiment, there is provided a method for controlling insects, comprising applying to an area to be treated, an effective amount of a composition resistant to active ingredient degradation comprising:
   a) a phosphoramidothioate; and
   b) an electrolyte;
      wherein said composition is formulated using a mixture of water and said electrolyte.

In an embodiment, there is provided a method for controlling insects, comprising applying to an area to be treated, an effective amount of a composition resistant to active ingredient degradation comprising:
   a) acephate; and
   b) an electrolyte;

wherein said composition is formulated using a mixture of water and said electrolyte.

In another embodiment, there is provided a method for controlling insects, comprising applying to an area to be treated, an effective amount of a composition resistant to active ingredient degradation comprising:
   a) a phosphoramidothioate;
   b) an electrolyte; and
   c) one or more active ingredients;
      wherein said composition is formulated using a mixture of water and said electrolyte.

In another embodiment, there is provided a method for controlling insects, comprising applying to an area to be treated, an effective amount of a composition resistant to active ingredient degradation comprising:
   a) Acephate;
   b) an electrolyte; and
   c) one or more active ingredients;
      wherein said composition is formulated using a mixture of water and said electrolyte.

In an embodiment, the present invention may provide methods of controlling insects such as those belonging to Lepidopteran, Coleoptran, Dipteran, Hemipteran classes of insects.

Accordingly, present invention provide a method for controlling insects, comprising applying to an area to be treated, an effective amount of a composition comprising:
   a) acephate; and
   b) an electrolyte;
   c) optionally one or more active ingredient;
      wherein said composition is formulated using a mixture of water and said electrolyte.

In another embodiment, the method comprises applying to an area to be treated, an effective amount of a composition comprising:
   a) acephate;
   b) an electrolyte; and
   c) one or more active ingredients;
      wherein said composition is formulated using a mixture of water and said electrolyte.

In another embodiment, the present invention provides use of a composition for controlling insects.

The instant invention is more specifically explained by below examples. However, it should be understood that the scope of the present invention is not limited by the examples in any manner. It will be appreciated by any person skilled in this art that the present invention includes below examples and further can be modified and altered within the technical scope of the present invention.

EXAMPLES

Example 1

A composition of acephate and beta-cypermethrin according to the present invention was prepared as given below:
   a) Raw materials used for the composition are listed below:

| Raw materials | Quantity (w/w) |
| --- | --- |
| Acephate | 85.0 |
| Beta-cypermethrin | 3.0 |
| Styrene acrylic polymeric dispersant | 3.00 |
| sodium lauryl sulphate | 2.00 |
| Polyvinyl pyrrolidone | 0.30 |

-continued

| Raw materials | Quantity (w/w) |
|---|---|
| sodium acetate | 3.64 |
| Precipitated silica | 0.35 |
| Water | 4.0 | b) Final composition of the product is given in the below table:

| Ingredients | Quantity (w/w) |
|---|---|
| Acephate | 85.0 |
| Beta-cypermethrin | 3.0 |
| Styrene acrylic polymeric dispersant | 3.00 |
| sodium lauryl sulphate | 2.00 |
| Polyvinyl pyrrolidone | 0.30 |
| sodium acetate | 3.64 |
| Precipitated silica | 0.35 | c) Process:

Weighed quantity of Sodium acetate was added to water (4 ml) to prepare a mixture (Part A). Weighed quantity of acephate and precipitated silica were mixed well. Beta-cypermethrin, sodium lauryl sulphate and styrene acrylic polymeric dispersant were milled together and mixed with acephate mixture (part B) at room temperature. Part B was then mixed with part A mixture to prepare a blend. The blend was then extruded using a basket extruder to get granules. The granules were dried (until the moisture content is <1%) and then packed.

Example 2

A composition of acephate according to the present invention was prepared as given below:
  a) Raw materials used for the composition are listed below:

| Raw materials | Quantity (w/w) |
|---|---|
| Acephate | 92.04 |
| Ammonium sulfate | 6.00 |
| Precipitated silica | 1.96 |
| water | 5 | b) Final composition of the product is given in the below table:

| Ingredients | Quantity (w/w) |
|---|---|
| Acephate | 92.04 |
| Ammonium sulfate | 6.00 |
| Precipitated silica | 1.96 | c) Process:

Ammonium sulfate was added to water (5 ml) to prepare a mixture (Part A). Weighed quantity of acephate and precipitated silica were milled using a suitable equipment to get the required particle size (Part B). Part B was then mixed with part A mixture to prepare a blend. The blend was then extruded using a basket extruder to get granules. The granules were dried (until the moisture content is <0.6%) and then packed.

Example 3

A composition of acephate and beta-cypermethrin according to the present invention was prepared as given below:
  a) Raw materials used for the composition are listed below:

| Raw materials | Quantity (w/w) |
|---|---|
| Acephate | 85.0 |
| Beta-cypermethrin | 3.0 |
| Styrene acrylic polymeric dispersant | 3.00 |
| sodium lauryl sulphate | 2.00 |
| Polyvinyl pyrrolidone | 0.30 |
| calcium chloride | 3.64 |
| Precipitated silica | 0.35 |
| Water | 3.5 | b) Final composition of the product is given in the below table:

| Ingredients | Quantity (w/w) |
|---|---|
| Acephate | 85.0 |
| Beta-cypermethrin | 3.0 |
| Styrene acrylic polymeric dispersant | 3.00 |
| sodium lauryl sulphate | 2.00 |
| Polyvinyl pyrrolidone | 0.30 |
| calcium chloride | 3.64 |
| Precipitated silica | 0.35 | c) The composition was prepared according to the process of example 1.

Example 4

A composition of acephate and imidacloprid according to the present invention was prepared as follows:
  a) Raw materials used for the composition are listed below:

| Raw materials | Quantity (w/w) |
|---|---|
| Acephate | 85.0 |
| Beta-cypermethrin | 3.0 |
| Styrene acrylic polymeric dispersant | 3.00 |
| sodium lauryl sulphate | 2.00 |
| Polyvinyl pyrrolidone | 0.30 |
| sodium chloride | 3.64 |
| Precipitated silica | 0.35 |
| water | 3 | b) Final composition of the product is given in the below table:

| Ingredients | Quantity (w/w) |
|---|---|
| Acephate | 85.0 |
| Beta-cypermethrin | 3.0 |
| Styrene acrylic polymeric dispersant | 3.00 |
| sodium lauryl sulphate | 2.00 |
| Polyvinyl pyrrolidone | 0.30 |
| sodium chloride | 3.64 |
| Precipitated silica | 0.35 | c) The composition was prepared according to the process of example 1.

Example 5

A composition of acephate and imidacloprid according to the present invention was prepared as follows:

a) Raw materials used for the composition are listed below:

| Raw materials | Quantity (w/w) |
| --- | --- |
| Acephate | 52.55 |
| Imidacloprid | 5.68 |
| Ammonium sulfate | 31.62 |
| Aerosil R972 | 1.0 |
| Anionic dispersant | 1.5 |
| castor oil ethoxylate | 6.0 |
| SAG 1572 | 0.02 |
| Precipitated silica | 1.63 |
| water | 10.0 | b) Final composition of the product is given in the below table:

| Ingredients | Quantity (w/w) |
| --- | --- |
| Acephate | 52.55 |
| Imidacloprid | 5.68 |
| Ammonium sulfate | 31.62 |
| Aerosil R972 | 1.0 |
| Anionic dispersant | 1.5 |
| castor oil ethoxylate | 6.0 |
| SAG 1572 | 0.02 |
| Precipitated silica | 1.63 |

C) Process:

About 10 g of ammonium sulfate was mixed with water (10 ml) to get a mixture (part A). Weighed quantity of imidacloprid, remaining part of ammonium sulfate and surfactants were milled using a suitable equipment to get a mixture of required particle size. Weighed quantity of acephate was then mixed to get part B mixture. Then, Part A and part B were blended to prepare a blend. The blend was then subjected to extrusion using an extruder. The product obtained was then dried and packed.

Example 6

A composition of acephate according to the present invention was prepared as follows:

a) Raw materials used for the composition are listed below:

| Raw materials | Quantity (w/w) |
| --- | --- |
| Acephate | 90 |
| sodium lauryl sulphate | 0.50 |
| Polyvinyl pyrrolidone | 0.30 |
| sodium chloride | 6.85 |
| water | 4.0 | b) Final composition of the product is given in the below table:

| Ingredients | Quantity (w/w) |
| --- | --- |
| Acephate | 90 |
| sodium lauryl sulphate | 0.50 |

-continued

| Ingredients | Quantity (w/w) |
| --- | --- |
| Polyvinyl pyrrolidone | 0.30 |
| sodium chloride | 6.85 | b) The composition was prepared according to the process of example 2.

Example 7

A composition of acephate according to the present invention was prepared as follows:

a) Raw materials used for the composition are listed below:

| Raw materials | Quantity (w/w) |
| --- | --- |
| Acephate | 95 |
| sodium lauryl sulphate | 0.50 |
| Polyvinyl pyrrolidone | 0.30 |
| Magnesium sulphate | 2.24 |
| water | 3.5 | b) Final composition of the product is given in the below table:

| Ingredients | Quantity (w/w) |
| --- | --- |
| Acephate | 95 |
| sodium lauryl sulphate | 0.50 |
| Polyvinyl pyrrolidone | 0.30 |
| Magnesium sulphate | 2.24 | c) The composition was prepared according to the process of example 2.

Example 8

A composition of acephate and beta-cypermethrin according to the present invention was prepared as given below:

a) Raw materials used for the composition are listed below:

| Raw materials | Quantity (w/w) |
| --- | --- |
| Acephate | 74 |
| Beta-cypermethrin | 6 |
| Styrene acrylic polymeric dispersant | 4.00 |
| sodium lauryl sulphate | 2.00 |
| Polyvinyl pyrrolidone | 0.30 |
| Mono ammonium phosphate | 10.80 |
| Precipitated silica | 0.35 |
| water | 6.0 | b) Final composition of the product is given in the below table:

| Ingredients | Quantity (w/w) |
| --- | --- |
| Acephate | 74.0 |
| Beta-cypermethrin | 6.0 |
| Styrene acrylic polymeric dispersant | 4.00 |

-continued

| Ingredients | Quantity (w/w) |
|---|---|
| sodium lauryl sulphate | 2.00 |
| Polyvinyl pyrrolidone | 0.30 |
| Mono ammonium phosphate | 10.80 |
| Precipitated silica | 0.35 | b) The composition was prepared according to the process of example 1.

Example 9

A composition of acephate and beta-cypermethrin according to the present invention was prepared as given below:
  a) Raw materials used for the composition are listed below:

| Raw materials | Quantity (w/w) |
|---|---|
| Acephate | 74.0 |
| Beta-cypermethrin | 6.0 |
| Styrene acrylic polymeric dispersant | 4.00 |
| sodium lauryl sulphate | 2.00 |
| Polyvinyl pyrrolidone | 0.30 |
| Di ammonium phosphate | 10.30 |
| Precipitated silica | 0.35 |
| pH modifier | 0.5 |
| water | 5.0 | b) Final composition of the product is given in the below table:

| Ingredients | Quantity (w/w) |
|---|---|
| Acephate | 74.0 |
| Beta-cypermethrin | 6.0 |
| Styrene acrylic polymeric dispersant | 4.00 |
| sodium lauryl sulphate | 2.00 |
| Polyvinyl pyrrolidone | 0.30 |
| Di ammonium phosphate dihydrate | 10.30 |
| Precipitated silica | 0.35 |
| pH modifier | 0.5 | a) The composition was prepared according to the process of example 1.

Example 10

A composition of acephate and beta-cypermethrin according to the present invention was prepared as given below:
  a) Raw materials used for the composition are listed below:

| Raw materials | Quantity (w/w) |
|---|---|
| Acephate | 85.0 |
| Beta-cypermethrin | 3.0 |
| Styrene acrylic polymeric dispersant | 3.0 |
| sodium lauryl sulphate | 2.0 |
| Polyvinyl pyrrolidone | 0.3 |
| Mono sodium phosphate | 4.11 |
| Precipitated silica | 0.35 |
| water | 3.5 | b) Final composition of the product is given in the below table:

| Ingredients | Quantity (w/w) |
|---|---|
| Acephate | 85.0 |
| Beta-cypermethrin | 3.0 |
| Styrene acrylic polymeric dispersant | 3.0 |
| sodium lauryl sulphate | 2 |
| Polyvinyl pyrrolidone | 0.3 |
| Mono sodium phosphate | 4.11 |
| Precipitated silica | 0.35 | a) The composition was prepared according to the process of example 1.

Example 11

A composition of acephate and beta-cypermethrin according to the present invention was prepared as given below:
  a) Raw materials used for the composition are listed below:

| Raw materials | Quantity (w/w) |
|---|---|
| Acephate | 74 |
| Beta-cypermethrin | 6 |
| Styrene acrylic polymeric dispersant | 4 |
| sodium lauryl sulphate | 2 |
| Polyvinyl pyrrolidone | 0.3 |
| Tri sodium Citrate | 10.97 |
| pH modifier | 0.5 |
| Precipitated silica | 0.35 |
| water | 4.5 | b) Final composition of the product is given in the below table:

| Ingredients | Quantity (w/w) |
|---|---|
| Acephate | 74 |
| Beta-cypermethrin | 6 |
| Styrene acrylic polymeric dispersant | 4 |
| sodium lauryl sulphate | 2 |
| Polyvinyl pyrrolidone | 0.3 |
| Tri sodium Citrate | 10.97 |
| pH modifier | 0.5 |
| Precipitated silica | 0.35 | a) The composition was prepared according to the process of example 1.

Example 12

A composition of acephate and beta-cypermethrin according to the present invention was prepared as given below:
  a) Raw materials used for the composition are listed below:

| Raw materials | Quantity (w/w) |
|---|---|
| Acephate | 85 |
| Beta-cypermethrin | 3 |
| Styrene acrylic polymeric dispersant | 3.00 |
| sodium lauryl sulphate | 2.00 |

-continued

| Raw materials | Quantity (w/w) |
|---|---|
| Polyvinyl pyrrolidone | 0.30 |
| Zinc sulphate | 5.27 |
| Precipitated silica | 0.35 |
| water | 5.5 | b) Final composition of the product is given in the below table:

| Raw materials | Quantity (w/w) |
|---|---|
| Acephate | 85 |
| Beta-cypermethrin | 3 |
| Styrene acrylic polymeric dispersant | 3.00 |
| sodium lauryl sulphate | 2.00 |
| Polyvinyl pyrrolidone | 0.30 |
| Zinc sulphate | 5.27 |
| Precipitated silica | 0.35 |
| water | 5.5 | a) The composition was prepared according to the process of example 1.

Example 13

A composition of acephate and bifenthrin according to the present invention was prepared as follows:

a) Raw materials used for the composition are listed below:

| Raw materials | Quantity (w/w) |
|---|---|
| Acephate | 76.5 |
| Bifenthrin | 6.4 |
| Ammonium sulfate | 10.36 |
| Precipitated Silica | 0.4 |
| Rodapon | 2.0 |
| Polyvinyl pyrrolidone | 0.3 |
| water | 10.0 | b) Final composition of the product is given in the below table:

| Ingredients | Quantity (w/w) |
|---|---|
| Acephate | 76.5 |
| Bifenthrin | 6.4 |
| Ammonium sulfate | 10.36 |
| Precipitated Silica | 0.4 |
| Rodapon | 2.0 |
| Polyvinyl pyrrolidone | 0.3 | d) Process:

The process of example 1 was followed to prepare the composition

Stability Studies of the Compositions According to the Present Invention:

Compositions according to the present invention were tested for the stability. The samples were kept at 54±2° C. for up to 14 days and stability parameters such as suspensibility, dispersibility, wet sieve analysis and degradation of active ingredients were tested.

Example 14

Physical parameters of a composition comprising acephate prepared as in Example 2 has been presented in the below table:

| Sl No | Parameters | Ambient | AHS (14 days) |
|---|---|---|---|
| 1 | Acephate (%) | 89.47 | 87.78 |
| 2 | No.of inversion | 1-2 | 1-2 |
| 3 | % Degradation | ND* | 1.88 |

*Not detected

Example 15

Physical parameters of a composition comprising acephate and imidacloprid prepared as in Example 5 has been presented in the below table:

| Sr.No | Parameters | Ambient | AHS 14 Days | AHS 28 Days |
|---|---|---|---|---|
| 1 | Acephate (%) | 52.66 | 52.66 | 51.65 |
| 2 | Imidachloprid (%) | 5.52 | 5.49 | 5.49 |
| 5 | No of Inversion | 2-3 | 2-3 | 2-3 |
| 6 | Wet sieve | Nil | Nil | Nil |
| 7 | Suspensibility | 103 | 102.98 | 102.80 |

% Degradation of the active ingredient:

| Active | % Degradation 14 Days | % Degradation 28 Days |
|---|---|---|
| Acephate | 0 | 1.91 |
| Imidachloprid | 0.54 | 0.54 |

Example 16

Physical parameters of a composition comprising acephate and bifenthrin prepared as in Example 13 has been presented in the below table

| Sl No | Parameters | Ambient | AHS (7 days) | AHS (14 days) |
|---|---|---|---|---|
| 1 | Acephate (%) | 74.80 | 74.55 | 74.34 |
| 2 | Bifenthrin (%) | 6.30 | 6.30 | 6.29 |
| 3 | No. of inversion | 1-2 | 1-2 | 1-2 |
| 4 | Wet sieve | Nil | Nil | Nil |
| 5 | Suspensibility | 103 | 102.89 | 102.20 |

% Degradation of the active ingredient:

| Active | % Degradation 7 Days | % Degradation 14 Days |
|---|---|---|
| Acephate | 0.33 | 0.61 |
| Bifenthrin | NA | 0.16 |

From the above experimental results, it has been established that the present invention provides stable compositions comprising acephate. Degradation of acephate is controlled substantially resulting in compositions that can be stored for a longer period. It has been further noted by the inventors that the compositions according to the present invention requires only a few inversions while dispersing the formulation. (No. of inversions of the formulation is an indication on the ease of dispersion of the formulation). The suspensibility of the compositions is also well maintained resulting in a product which greatly satisfies all the requirements for an improved shelf life and for the intended activity of the composition.

COMPARATIVE EXAMPLES

Comparative Example 1

A composition of Acephate was prepared as given below:
a) Raw materials used for the composition are listed below:

| Raw materials | Quantity (w/w) |
| --- | --- |
| Acephate | 92.04 |
| Ammonium sulfate | 6.00 |
| Precipitated silica | 1.96 |
| water | 5 | b) Final composition of the product is given in the below table:

| Ingredients | Quantity (w/w) |
| --- | --- |
| Acephate | 92.04 |
| Ammonium sulfate | 6.00 |
| Precipitated silica | 1.96 | c) Process:
Weighed quantity of acephate and ammonium sulfate were mixed together and milled using a suitable equipment to get the required particle size. Water added to prepare a blend. The blend was then extruded using a basket extruder to get granules. The granules were then dried and packed.

Comparative Example—2

A composition of acephate and imidacloprid was prepared as follows:
a) Raw materials used for the composition are listed below:

| Raw materials | Quantity (w/w) |
| --- | --- |
| Acephate | 52.55 |
| Imidacloprid | 5.68 |
| Ammonium sulfate | 31.62 |
| Aerosil R972 | 1.0 |
| Anionic surfactant | 1.5 |
| castor oil ethoxylate | 6.0 |
| SAG 1572 | 0.02 |
| Precipitated silica | 1.63 |
| water | 10.0 | b) Final composition of the product is given in the below table:

| Ingredients | Quantity (w/w) |
| --- | --- |
| Acephate | 52.55 |
| Imidacloprid | 5.68 |

-continued

| Ingredients | Quantity (w/w) |
| --- | --- |
| Ammonium sulfate | 31.62 |
| Aerosil R972 | 1.0 |
| Anionic surfactant | 1.5 |
| castor oil ethoxylate | 6.0 |
| SAG 1572 | 0.02 |
| Precipitated silica | 1.63 |

C) Process:
Same process as comparative example—1 is followed where weighed quantity of imidacloprid, ammonium sulfate and surfactants were milled using a suitable equipment to get a mixture of required particle size. Weighed quantity of acephate was then mixed to get premix mixture. Water added to premix mixture to prepare a blend. The blend was then subjected to extrusion using an extruder. The product obtained was then dried and packed.

Compositions of comparative example 1 and 2 were tested for the stability. The samples were kept at 54±2° C. for up to 14 days and stability parameters such as suspensibility, dispersibility, wet sieve analysis and degradation of active ingredients were tested. Physical parameters of a composition comprising acephate according to comparative example 1 is given below:

| Sl No | Parameters | Ambient | AHS (14 days) |
| --- | --- | --- | --- |
| 1 | Acephate (%) | 88.43 | 77.95 |
| 2 | No.of inversion | 1-2 | 12-15 with grit |
| 3 | % Degradation | | 11.85 |

Physical parameters of a composition comprising acephate and imidacloprid according to comparative example 2 is given below:

| Sr.No | Parameters | Ambient | AHS 14 Days |
| --- | --- | --- | --- |
| 1 | Acephate (%) | 51.51 | 46.11 |
| 2 | Imidachloprid (%) | 5.45 | 4.4 |
| 5 | No of Inversion | 2-3 | 30 with grit |
| 6 | Wet sieve | Nil | 1.02 |
| 7 | Suspensibility | 103 | 77.2 |

% Degradation of the active ingredient:

| Active | % Degradation 14 Days |
| --- | --- |
| Acephate | 10.48 |
| Imidachloprid | 19.26 |

Comparative Example 3

A composition of acephate and bifenthrin was prepared as follows:

| Ingredients | Quantity (w/w) |
| --- | --- |
| Acephate | 76.02 |
| Bifenthrin | 6.33 |

-continued

| Ingredients | Quantity (w/w) |
|---|---|
| Metasperse | 3.00 |
| soprophor-wp | 2.00 |
| PG-4000 | 6.50 |
| ammonium sulphate | 5.80 |
| Mfill A-100 | 0.35 |

Process: Weighed quantity of bifenthrin was mixed with Mfill A-100 to form bifenthrin premix. The bifenthrin premix was milled in airjet mill to obtain desired particle size. Weighed quantity of acephate and other surfactants were then added to the bifenthrin premix to obtain bifenthrin-acephate premix. Bifenthrin-acephate premix was then extruded by hot melt extrusion process on axial extruder to get the granules—Granules thus obtained was then sieved to remove oversize granules and undersize granules. The finished granules were subjected to quality specification and packed.

Physical parameters of a composition comprising acephate and imidacloprid according to comparative example 3 is given below

| Physicochemical properties | |
|---|---|
| Dispersion immediate after processing | Good |
| No of inversion | 12 |
| Dispersion after 3 days aging after Processing | poor |
| No of inversion | >30 |

Above experimental results indicate that while following conventional procedures for preparing compositions comprising acephate, it leads to degradation of acephate that cannot be stored for a longer period. It has been further noted compositions according to the conventional procedures requires a large no. of inversions while dispersing the formulation. The suspensibility of the compositions were also not within the acceptable limits making them unsuitable for the intended activity of the product.

The invention claimed is:

1. A process for preparing a composition of a phosphoramidothioate that is resistant to degradation, said process comprising:
   preparing a mixture of water and an electrolyte in a ratio from 1:1 to 1:20;
   preparing a blend of a phosphoramidothioate active ingredient, remaining electrolyte if any, excipients, and optionally one or more additional active ingredients;
   preparing an admixture of the blend with the mixture of the water and electrolyte, and
   formulating the admixture, wherein said phosphoramidothioate is acephate,
   wherein degradation of acephate is less than 5% by weight of acephate in the composition after 14 days at 54±2° C.

2. The process of claim 1, wherein said electrolyte is an inorganic or an organic salt.

3. The process of claim 1, wherein said one or more additional active ingredients is selected from an organophosphorus compound, a chloronicotinyl compound, a diamide insecticide, a benzoylphenylurea chitin synthesis inhibitor, and a pyrethroid compound.

4. The process of claim 2, wherein said electrolyte is the organic salt selected the group consisting of an alkali or an alkaline earth metal salt of an organic acid and an alkali metal salt of a weak organic acid.

5. The process of claim 3, wherein said one or more additional active ingredients is selected from the group consisting of acetamiprid, imidacloprid, thiacloprid, thiamethoxam, cypermethrin, fenvalerate, permethrin, alpha-cypermethrin, beta-cypermethrin, zeta- cypermethrin, deltamethrin, bifenthrin, lambda-cyhalothrin, bioresmethrin, chlorantraniliprole, cyantraniliprole, cyclaniliprole, tetrachlorantraniliprole, lufenuron, and novaluron.

* * * * *